(12) United States Patent
Kato

(10) Patent No.: US 9,616,631 B2
(45) Date of Patent: Apr. 11, 2017

(54) SUPPORTING METHOD OF HONEYCOMB FORMED BODY

(71) Applicant: NGK INSULATORS, LTD., Nagoya (JP)

(72) Inventor: Shigeki Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 199 days.

(21) Appl. No.: 14/073,194

(22) Filed: Nov. 6, 2013

(65) Prior Publication Data

US 2014/0138871 A1     May 22, 2014

(30) Foreign Application Priority Data

Nov. 16, 2012    (JP) ................................ 2012-252674

(51) Int. Cl.
     *B29D 99/00*          (2010.01)
     *B28B 11/16*          (2006.01)
     (Continued)

(52) U.S. Cl.
     CPC ........ *B29D 99/0089* (2013.01); *B28B 11/243* (2013.01); *B28B 13/04* (2013.01);
     (Continued)

(58) Field of Classification Search
     CPC ......... B28B 11/243; B28B 13/04; B28B 3/20; B29C 47/0028; B29C 47/34; B29D 99/0089
     (Continued)

(56) References Cited

U.S. PATENT DOCUMENTS 5,229,079 A    7/1993   Harada et al.
5,229,080 A    7/1993   Abe et al.
(Continued)

FOREIGN PATENT DOCUMENTS

EP    0 449 556 A2    10/1991
EP    2 239 037 A1    10/2010
(Continued)

OTHER PUBLICATIONS

Extended European Search Report (Application No. 13192818.6) dated Jun. 5, 2014.

*Primary Examiner* — Alison L Hindenlang
*Assistant Examiner* — Jerzi H Moreno Hernandez
(74) *Attorney, Agent, or Firm* — Burr & Brown, PLLC

(57) ABSTRACT

There is disclosed a method capable of effectively suppressing deformation when a honeycomb formed body formed by horizontal extrusion is supported by a cradle, and supporting even a large honeycomb formed body so that cell wall buckling hardly occur and a high shape accuracy is kept, wherein the lowermost end of a supporting surface of the cradle is located below the lowermost end of the honeycomb formed body immediately after extruded through the die during the horizontal movement, and a distance in a vertical direction between the lowermost end of the honeycomb formed body immediately after extruded through the die and the lowermost end of the supporting surface of the cradle is from 5 to 15 mm during the horizontal movement when a honeycomb formed body extruded through a die in a horizontal direction by extrusion is supported by a cradle.

14 Claims, 3 Drawing Sheets

(51) Int. Cl.
  *B29C 47/34* (2006.01)
  *B28B 13/04* (2006.01)
  *B28B 3/20* (2006.01)
  *B28B 11/24* (2006.01)
  *B29C 47/00* (2006.01)

(52) U.S. Cl.
  CPC ............. *B28B 3/20* (2013.01); *B29C 47/0028* (2013.01); *B29C 47/34* (2013.01)

(58) Field of Classification Search
  USPC ........................................................ 264/232
  See application file for complete search history.

(56) References Cited

U.S. PATENT DOCUMENTS

| | | | |
|---|---|---|---|
| 5,234,668 A | 8/1993 | Harada et al. | |
| 5,264,186 A | 11/1993 | Harada et al. | |
| 5,961,918 A * | 10/1999 | Day | 266/227 |
| 8,245,839 B2 * | 8/2012 | Tajima et al. | 198/867.11 |
| 2004/0076705 A1 | 4/2004 | Ishikawa et al. | |
| 2004/0104514 A1 * | 6/2004 | Ishikawa | B28B 3/206 264/489 |
| 2005/0167880 A1 * | 8/2005 | Nate et al. | 264/177.12 |
| 2006/0012073 A1 * | 1/2006 | Miura et al. | 264/177.12 |
| 2007/0194480 A1 | 8/2007 | Ishikawa et al. | |
| 2010/0237123 A1 | 9/2010 | Fujioka et al. | |
| 2010/0248951 A1 | 9/2010 | Ohno et al. | |
| 2011/0083942 A1 | 4/2011 | Tajima et al. | |

FOREIGN PATENT DOCUMENTS

| | | | |
|---|---|---|---|
| JP | 04-081509 A1 | 3/1992 | |
| JP | 2004-142160 A1 | 5/2004 | |
| JP | 2010-221155 A1 | 10/2010 | |
| JP | 2013-230568 A1 | 11/2013 | |
| WO | 2009/122539 A1 | 10/2009 | |
| WO | WO 2010099282 A1 * | 9/2010 | ............... B28B 1/02 |

* cited by examiner

SUPPORTING METHOD OF HONEYCOMB FORMED BODY

The present application is an application based on JP-2012-252674 filed on Nov. 16, 2012 with the Japanese Patent Office, the entire contents of which are incorporated herein by reference.

BACKGROUND OF THE INVENTION

Field of the Invention

The present invention relates to a method for supporting a honeycomb formed body formed by horizontal extrusion by a cradle wherein an extruding direction is horizontal. More particularly, the present invention relates to a supporting method of a honeycomb formed body capable of suppressing the deformation of the honeycomb formed body due to a load, which applied from a cradle to the honeycomb formed body, by reducing the load at the time of supporting the honeycomb formed body formed by horizontal extrusion by the cradle, even if the honeycomb formed body has a large size.

Description of Related Art

In various fields of chemistry, power, iron and steel and the like, a ceramic honeycomb structure has been employed as a carrier for a catalyst device to be used for an environment countermeasure, recovery of a specific substance, or the like. Moreover, the ceramic honeycomb structure has broadly been used as an exhaust gas purifying filter such as a diesel particulate filter (DPF).

Such a honeycomb structure is usually manufactured by drying and firing a honeycomb-shaped formed body (the honeycomb formed body) obtained by extrusion. As the extrusion of the honeycomb structure, there is employed horizontal extrusion (e.g., see Patent Document 1) in which an extruding direction is horizontal, or vertical extrusion (e.g., see Patent Document 2) in which the extruding direction is vertical (downward).

In general, the horizontal extrusion is employed for formation of a small honeycomb formed body having an outer diameter smaller than about 150 mm, and the vertical extrusion is employed for formation of a large honeycomb formed body having an outer diameter of 150 mm or more.

[Patent Document 1] JP-A-2004-142160
[Patent Document 2] JP-A-H04-81509

SUMMARY OF THE INVENTION

When a honeycomb formed body is formed by horizontal extrusion, it is necessary to support the honeycomb formed body extruded through a die in a horizontal direction, from the downside by a cradle having a supporting surface which comes in contact with a peripheral surface of the honeycomb formed body. Moreover, since the honeycomb formed body is soft immediately after being extruded through the die, deformation is likely to occur due to an overload when the peripheral surface thereof comes in contact with the supporting surface of the cradle.

The load when the peripheral surface of the honeycomb formed body comes in contact with the supporting surface of the cradle increases, as a size (a diameter) of the honeycomb formed body increases. Therefore, in a large honeycomb formed body having an outer diameter of 150 mm or more, cell wall buckling (collapse of the cell) (hereinafter, it may be simply referred to "buckling") is likely to occur by the deformation due to this load.

When a portion of occurrence of buckling is close to an outer periphery of the honeycomb formed body, it may be possible to satisfy a predetermined product shape by removing the portion by outer periphery processing after firing, and then applying anew coating to the outer periphery thereof to form a peripheral wall again. However, when the portion of occurrence of buckling is away from the outer periphery of the honeycomb formed body to a certain degree, it becomes difficult to remove the portion by the outer periphery processing, and thereby the predetermined product shape cannot be satisfied.

Consequently, it has heretofore been difficult to manufacture a large honeycomb structure in realistically allowable yield rate by the horizontal extrusion. Moreover, even when it does not result in the buckling, since it is inevitable to some extent of deformation, in manufacture of an integrally formed product in which the above-mentioned outer periphery processing and peripheral wall re-formation are not premised, there has been the problem that a shape accuracy is deteriorated and the predetermined product shape can not be satisfied. It is to be noted that as a buckling prevention countermeasure in the horizontal extrusion, high hardness of a kneaded material used in the extrusion is usually effective, but this high hardness of the kneaded material has the problem that low productivity, life shortening of the die, deterioration of formability and the like are caused.

On the other hand, when the honeycomb formed body is formed by vertical extrusion, since the honeycomb formed body extruded through the die in a vertical direction (downward) is supported by the cradle disposed below the die in a state where an end face thereof comes in contact with the cradle, the overload is not applied from the cradle to the peripheral surface thereof. Consequently, even when the large honeycomb formed body is supported, the deformation of the honeycomb formed body due to the overload does not occur.

Therefore, when the vertical extrusion is employed, the buckling does not occur in the formation of the large honeycomb formed body, and it is possible to subject to subsequent manufacturing steps (cutting, drying, firing, etc.) while maintaining a shape of the honeycomb formed body immediately after the formation. In consequence, the honeycomb structure having good shape accuracy can be obtained in high yield rate.

However, in the vertical extrusion, workability is poor since the equipment becomes large and a supply port of a forming machine for the kneaded material is present in a high portion, as compared with horizontal extrusion. Moreover, steps of the vertical extrusion are more complicated than those of the horizontal extrusion. Specifically, the horizontal extrusion can continuously perform a series of steps from kneading of a forming raw material to the extrusion with a single device (a continuous forming machine). On the other hand, the vertical extrusion needs to perform the respective steps by separate devices such that the forming raw material is kneaded by a kneader or the like, the resultant is formed into a columnar kneaded material by a clay kneader or the like, and this columnar kneaded material is supplied to a ram type vertical extrusion machine or the like, to perform the extrusion. Furthermore, the continuous forming machine for the horizontal extrusion (a biaxial kneading type continuous forming machine or the like) enables the kneading of the forming raw material having a high hardness, but the kneader or the like for use in the kneading of the forming raw material for the vertical extrusion can only be applied to the kneading of the forming raw material having a low hardness.

Therefore, in recent years, as to the large honeycomb formed body, a demand for such technical development that enables the formation by the horizontal extrusion has increased.

The present invention has been developed in view of such situations, and an object thereof is to provide a method capable of suppressing the deformation at the time of supporting a honeycomb formed body formed by horizontal extrusion by a cradle, and supporting a honeycomb formed body such a state that buckling hardly occurs while maintaining high shape accuracy even when the honeycomb formed body has a large size.

To achieve the above object, according to the present invention, the following supporting methods of a honeycomb formed body are provided.

[1] A supporting method of a honeycomb formed body including: extruding a kneaded material obtained by kneading a forming raw material through a die to form a honeycomb formed body having partition walls defining a plurality of cells extending in an extruding direction, and supporting the honeycomb formed body extruded through the die by a cradle having a supporting surface at a downstream position of the die in the extruding direction, wherein the extruding direction is horizontal, the cradle moves horizontally in the extruding direction after lifting from a position below the die at the downstream position of the die, a lowermost end of the supporting surface of the cradle is located below a lowermost end of the honeycomb formed body immediately after extruded through the die during a horizontal movement, and a distance in a vertical direction between the lowermost end of the honeycomb formed body immediately after extruded through the die and the lowermost end of the supporting surface of the cradle is from 5 to 15 mm during the horizontal movement.

[2] The supporting method of the honeycomb formed body according to the above [1], wherein the cradle is disposed so that a longitudinal direction of the cradle is the same as the extruding direction, and moves horizontally in the extruding direction at the same speed as an extrusion speed.

[3] The supporting method of the honeycomb formed body according to the above [1] or [2], wherein means for supporting the honeycomb formed body is not interposed between the die and the cradle.

[4] The supporting method of the honeycomb formed body according to any one of the above [1] to [3], wherein the distance in the vertical direction between the lowermost end of the honeycomb formed body immediately after extruded through the die and the lowermost end of the supporting surface of the cradle is from 8 to 12 mm during the horizontal movement.

[5] The supporting method of the honeycomb formed body according to any one of the above [1] to [4], wherein an outer diameter of the honeycomb formed body is 100 mm or more.

[6] The supporting method of the honeycomb formed body according to any one of the above [1] to [5], wherein the outer diameter of the honeycomb formed body is from 100 to 450 mm, and an open frontal area of the honeycomb formed body in a cross section perpendicular to an axial direction is from 69 to 91%.

[7] The supporting method of the honeycomb formed body according to any one of the above [1] to [6], wherein a hardness of the kneaded material is from 0.8 to 2.8 kgf.

[8] The supporting method of the honeycomb formed body according to any one of the above [1] to [7], wherein a length of the cradle is from 100 to 500 mm.

[9] The supporting method of the honeycomb formed body according to any one of the above [1] to [8], wherein the distance in the vertical direction between the lowermost end of the honeycomb formed body immediately after extruded through the die and the lowermost end of the supporting surface of the cradle during the horizontal movement is measured when a distance in the horizontal direction between the die and the cradle is determined by adding 100 to 200 mm to the length of the cradle.

[10] The supporting method of the honeycomb formed body according to any one of the above [1] to [9], wherein the honeycomb formed body is the one for use in manufacture of a diesel particulate filter.

[11] The supporting method of the honeycomb formed body according to any one of the above [1] to [10], wherein a horizontal continuous forming machine is used in the extrusion of the honeycomb formed body.

According to the present invention, when a honeycomb formed body formed by horizontal extrusion is supported by a cradle, a load applied from the cradle to the honeycomb formed body can be reduced. In consequence, even when a large honeycomb formed body is supported, deformation of the honeycomb formed body due to an overload can effectively be suppressed. Therefore, when the supporting method of the present invention is used to support the honeycomb formed body after the extrusion in a manufacturing process of a honeycomb structure, shape accuracy of the honeycomb structure is increased, and an incidence of buckling is reduced, to improve the yield rate. Moreover, excessive increase of a hardness of a kneaded material for prevention of the buckling is not required, thereby enabling production using the kneaded material having the hardness suitably adjusted in accordance with an outer diameter, a cell structure, an open frontal area and the like. Therefore, it is possible to produce the honeycomb structure without reducing the productivity, shortening life of a die, or deteriorating the formability.

DETAILED DESCRIPTION OF THE INVENTION

Hereinafter, embodiments of the present invention will specifically be described, but it should be understood that the present invention is not limited to the following embodiment and that suitable modifications, improvements and the like added to the following embodiments on the basis of ordinary knowledge of a person skilled in the art without departing from the gist of the present invention also fall in the gist of the present invention.

Figure 1:
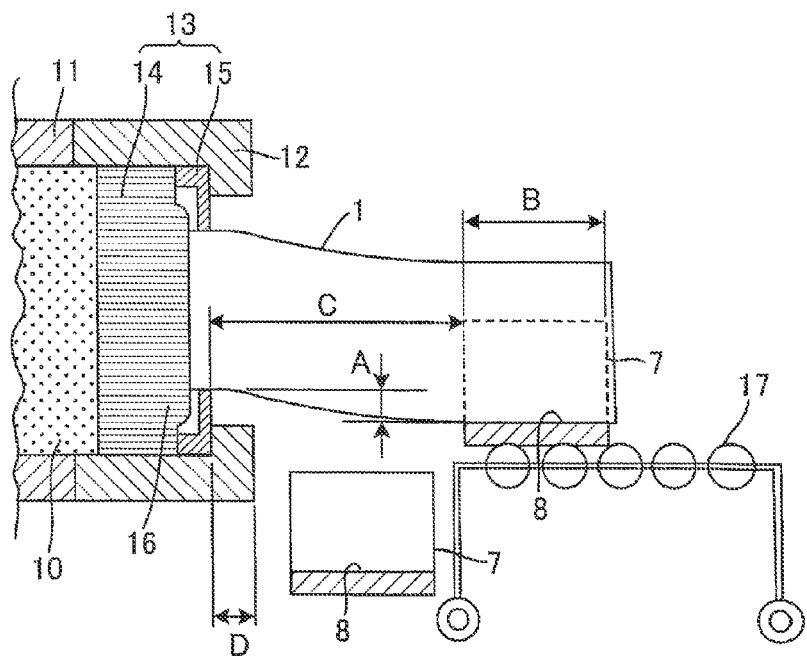
FIG. 1 is an explanatory view schematically showing an example of an embodiment of the present invention.
Figure 2:
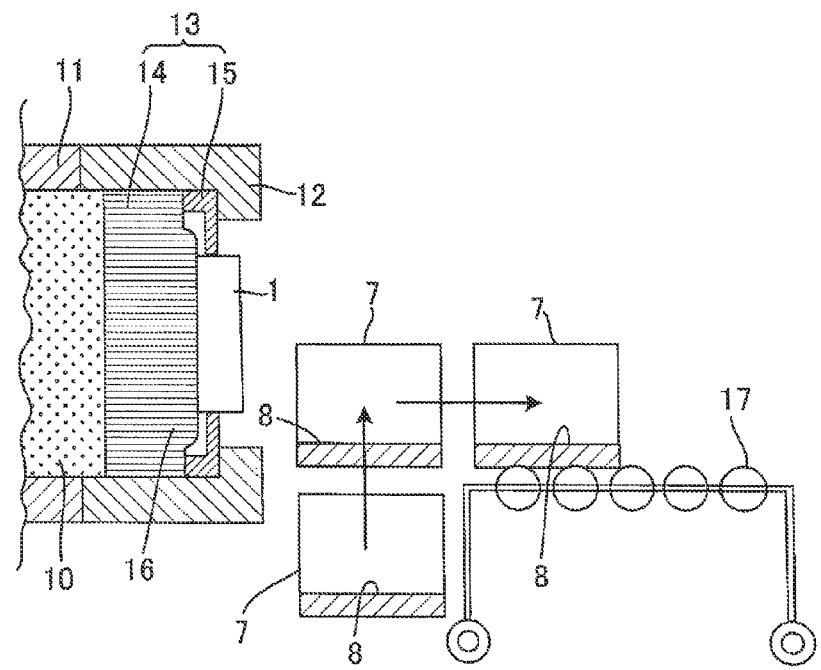
FIG. 2 is an explanatory view schematically showing an operation of a cradle in the present invention.
Figure 3:
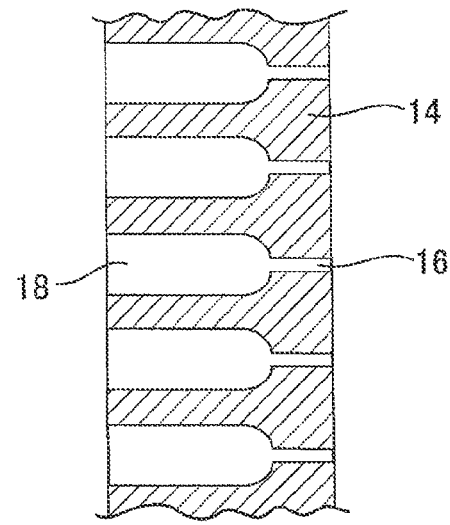
FIG. 3 is a partially enlarged cross-sectional view schematically showing an example of a die main body for use in the present invention.
Figure 4:
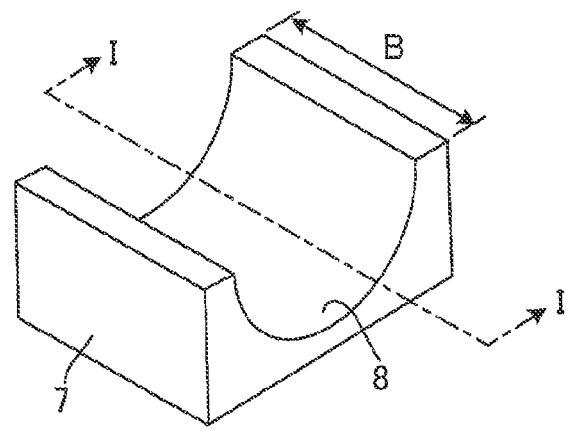
FIG. 4 is a perspective view schematically showing an example of the cradle for use in the present invention.
Figure 5:
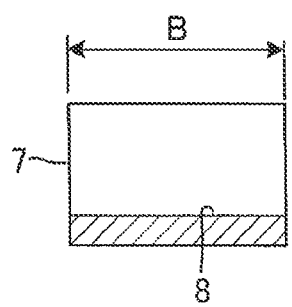
FIG. 5 is a cross-sectional view cut along the I-I line of FIG. 4.
Figure 6:
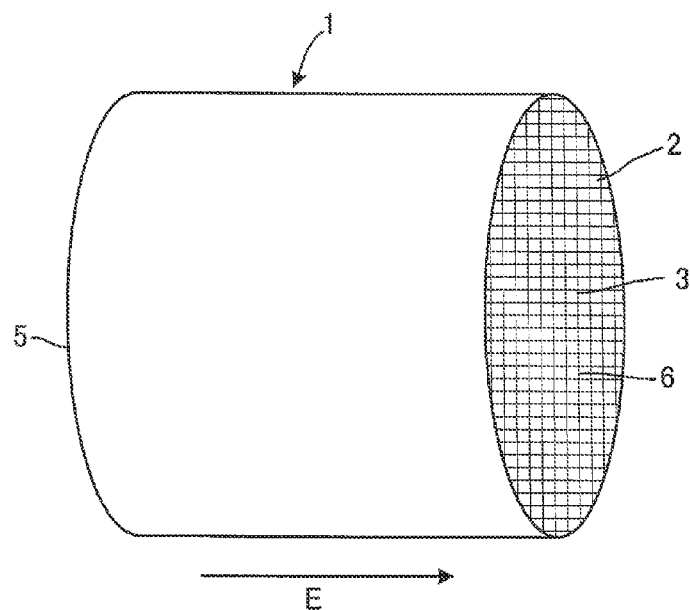
FIG. 6 is a perspective view schematically showing an example of a honeycomb formed body.

(1) Supporting Method of Honeycomb Formed Body:

FIG. 1 is an explanatory view schematically showing an example of an embodiment of the present invention, and FIG. 2 is an explanatory view schematically showing an operation of a cradle in the present invention. FIG. 3 is a partially enlarged cross-sectional view schematically showing an example of a die main body for use in the present invention. Moreover, FIG. 4 is a perspective view schematically showing an example of the cradle for use in the present invention, and FIG. 5 is a cross sectional view cut along the I-I line of FIG. 4. FIG. 6 is a perspective view schematically showing an example of a honeycomb formed body.

As shown in FIG. 1, a supporting method of a honeycomb formed body of the present invention extrudes a kneaded material 10 obtained by kneading a forming raw material through a die 13 to form a honeycomb formed body 1, and then supports the extruded honeycomb formed body 1 by a cradle 7. Here, "the honeycomb formed body" is a columnar formed body having partition walls 3 defining a plurality of cells 2 extending in an extruding direction E at the extrusion, as shown in FIG. 6.

The die 13 is fixed to a die holder 12 at an outlet side end of a cylinder 11 of an extrusion machine. The die 13 in the present embodiment is constituted of a die main body 14, and a retainer plate 15 disposed at an outlet side of the die main body 14. As shown in FIG. 3, the die main body 14 has slits 16 formed so as to correspond to a partition wall thickness, a cell pitch or the like of the honeycomb formed body to be obtained by the extrusion, and back holes (kneaded material introducing holes) 18 communicating with the slits 16. Moreover, the retainer plate 15 is an annular member provided with open frontal areas to determine a shape and an outer diameter in a cross section perpendicular to an axial direction (the extruding direction) of the honeycomb formed body to be obtained by the extrusion.

The cradle 7 supports the honeycomb formed body 1, and has a supporting surface 8 which comes in contact with a peripheral surface of the honeycomb formed body 1 during the supporting. The supporting surface 8 is formed so as to extend along the shape in the cross section perpendicular to an axial direction of the honeycomb formed body 1. The cradle 7 shown in FIG. 4 is an example of the cradle provided with the supporting surface 8 having an arc-like cross section in order to support the honeycomb formed body having a round shape in cross section perpendicular to the axial direction.

As shown in FIG. 2, the cradle 7 is sequentially supplied from a space between the die 13 and horizontal conveying means such as a conveyor 17 for horizontal movement of the cradle 7. Specifically, between the die 13 and horizontal conveying means such as the conveyor 17, the cradle 7 is lifted from a position below the die 13 to a preset position (the highest lifting position) by lifting means (not shown) such as an elevator. Afterward, the cradle 7 moves horizontally in the extruding direction by horizontal conveying means such as the conveyor 17, while keeping a height of the highest lifting position. The cradle 7 performing such an operation is sequentially supplied, and thereby the honeycomb formed body 1 extruded through the die 13 is supported by the cradle 7 in a state where the peripheral surface thereof comes in contact with the supporting surface 8 of the cradle 7 at a downstream position of the die 13 in the extruding direction. The honeycomb formed body 1 supported by the cradle 7 is conveyed downstream in the extruding direction by the horizontal movement of the cradle 7, and supplied to the subsequent step (a cutting step or the like).

In the present invention, the honeycomb formed body 1 being a support object of the cradle 7 is formed by horizontal extrusion. That is, this honeycomb formed body 1 is formed by extruding the kneaded material 10 obtained by kneading a forming raw material through the die 13 in a horizontal direction. The honeycomb formed body 1 extruded through the die 13 in the horizontal direction then starts to bend (sag) downwardly due to gravity, and comes in contact with the supporting surface 8 of the cradle 7 to be supported by the cradle 7 at the time of bent to some extent.

In the present invention, when the honeycomb formed body 1 formed by the horizontal extrusion in this manner is supported by the cradle 7, the lowermost end of the supporting surface 8 of the cradle 7 is located below the lowermost end of the honeycomb formed body 1 immediately after extruded through the die 13 during the horizontal movement. Additionally, a distance A in a vertical direction between the lowermost end of the honeycomb formed body 1 immediately after extruded through the die 13 and the lowermost end of the supporting surface 8 of the cradle 7 is from 5 to 15 mm during the horizontal movement, and preferably from 8 to 12 mm. Hereinafter, "the distance in the vertical direction between the lowermost end of the honeycomb formed body immediately after extruded through the die and the lowermost end of the supporting surface of the cradle during the horizontal movement" may be referred to as "a drop".

The present inventors have found that when the honeycomb formed body 1 formed by the horizontal extrusion is supported by the cradle 7, a load applied from the cradle 7 to the honeycomb formed body 1 remarkably varies in accordance with a value of a drop A in FIG. 1. Moreover, as a result of investigation repeated by setting the drop A to various values, it has been found that by setting the drop A to 5 to 15 mm, deformation of the honeycomb formed body 1 due to an overload can effectively be suppressed, even when the large honeycomb formed body 1 having an outer diameter of 150 mm or more is supported.

Therefore, when the supporting method of the present invention is used to support the honeycomb formed body after the extrusion in a manufacturing process of a honeycomb structure, shape accuracy of the honeycomb structure is increased, and an incidence of buckling is reduced. In particular, when the drop A is set to 8 to 12 mm, the incidence of buckling is remarkably reduced. Moreover, when the supporting method of the present invention is used, a portion where the buckling occurs is often a portion adjacent to an outer periphery of the honeycomb formed body even in a case where the buckling occurs. Therefore, in the honeycomb formed body formed on the assumption performing the outer periphery processing after firing, there is a high possibility that the portion of occurrence of buckling can be removed by the outer periphery processing to improve the yield rate. Furthermore, by optimizing the drop A, excessive increase of a hardness of the kneaded material for prevention of the buckling is not required, thereby enabling production using the kneaded material having the hardness suitably adjusted in accordance with the outer diameter, a cell structure, an open frontal area and the like. Therefore, it is possible to produce the honeycomb structure without reducing the productivity, shortening life of a die, or deteriorating the formability.

It is to be noted that when the drop A is in excess of 15 mm, an amount of the bending of the honeycomb formed body 1 extruded through the die 13 in the horizontal direction due to the gravity increases while in contact with the supporting surface 8 of the cradle 7. Furthermore, when the honeycomb formed body 1 comes in contact with the supporting surface 8 of the cradle 7, the load applied from the cradle 7 to the peripheral surface of the honeycomb formed body 1 excessively increases. Therefore, the deformation of the honeycomb formed body 1 due to the overload is likely to occur and the shape accuracy deteriorates, thereby increasing the incidence of buckling. Moreover, the portion of occurrence of buckling is more often a portion away from the outer periphery of the honeycomb formed body 1 to a certain degree (a portion close to the center of the honeycomb formed body 1). In this case, since it is difficult to remove the buckling portion by the outer periphery processing after the firing, yield rate becomes lower even in the honeycomb formed body formed on the assumption performing such outer periphery processing.

Moreover, it does not follow that a deformation preventing effect of the honeycomb formed body enhances as the drop A is small. As described above, the cradle 7 is lifted from the position below the die 13 to the preset position (the highest lifting position) at the downstream position of the die 13 (between the die 13 and horizontal conveying means such as the conveyor 17), and then moves horizontally in the extruding direction while keeping the height of the highest lifting position. That is, a height of the lowermost end of the supporting surface 8 of the cradle 7 at the highest lifting position is the same as a height of the lowermost end of the supporting surface 8 of the cradle 7 during the horizontal movement. Therefore, the lowermost end of the supporting surface 8 of the cradle 7 at the highest lifting position is located below the lowermost end of the honeycomb formed body 1 immediately after extruded through the die 13.

However, since the honeycomb formed body 1 starts to bend (sag) downwardly due to the gravity immediately after extruded through the die 13, when the drop A is small, the cradle 7 comes in contact with the honeycomb formed body 1 in the middle of a lifting. Moreover, the cradle 7 slightly pushes up the honeycomb formed body 1 bent downwardly in a direction (upward) opposite to a gravity direction during reaching the highest lifting position by further lifting after in contact with the honeycomb formed body 1. That is, the honeycomb formed body 1 once bent downwardly due to the gravity is then bent upwardly. Here, the distance in which the cradle 7 pushes up the honeycomb formed body 1 (a lifting distance from when the cradle 7 comes in contact with the honeycomb formed body 1 to when the cradle reaches the highest lifting position) increases, as the drop A is small. When the drop A is smaller than 5 mm, since the distance in which the cradle 7 pushes up the honeycomb formed body 1 excessively increases, the overload is applied to the honeycomb formed body 1.

In consequence, the deformation of the honeycomb formed body 1 due to the overload is likely to occur, and the shape accuracy deteriorates, to increase the incidence of buckling. Furthermore, similarly to the case where the drop A is in excess of 15 mm, the portion of occurrence of buckling is more often the portion away from the outer periphery of the honeycomb formed body 1 to a certain degree (the portion close to the center of the honeycomb formed body 1). In this case, since it is difficult to remove the buckling portion by the outer periphery processing after the firing, the yield rate is lower even in the honeycomb formed body formed on the assumption performing such outer periphery processing.

As described above, the cradle 7 is lifted between the die 13 and horizontal conveying means such as the conveyor 17 before horizontal movement. Therefore, in order to acquire a space for the lift of the cradle, it is required that a distance in the horizontal direction between the die 13 and horizontal conveying means such as the conveyor 17 is longer than a length B of the cradle 7. For example, as in the embodiment of FIG. 1, it is required to set the distance in the horizontal direction between the die 13 and horizontal conveying means such as the conveyor 17 so that a tip of the die holder 12 does not interfere with the cradle 7 during lifting, even when the tip of the die holder 12 projects from the outlet side end of the die 13 in the extruding direction. Specifically, the distance is preferably determined by adding 100 to 200 mm to the length B of the cradle 7. Here, for the horizontal movement of the cradle 7, it is required to be present on a horizontal conveying means such as the conveyor 17. Therefore, a distance C in the horizontal direction between the die 13 and the cradle 7 when the cradle 7 starts the horizontal movement is also preferably determined by adding 100 to 200 mm to the length B of the cradle 7, in the same manner as in the distance in the horizontal direction between the die and horizontal conveying means such as the conveyor. It is to be noted that a thickness D of the die holder 12 (a length of a portion projecting from the outlet side end of the die 13 in the extruding direction) is usually from 30 to 50 mm. Moreover, the drop A in the present invention is preferably measured when the distance C in the horizontal direction between the die 13 and the cradle 7 is the above-mentioned distance.

The length B of the cradle 7 is preferably shorter than a target length of the honeycomb formed body 1 to be cut in the subsequent cutting step. When the length B of the cradle 7 is such a length, it is easy to cut the honeycomb formed body 1 into the target length, between the adjacent cradles 7 and 7 sequentially conveyed to a position where the cutting step is performed at the downstream position in the extruding direction via a predetermined space, by a cutting tool such as a wire. Therefore, specifically, it is preferable that the length B of the cradle 7 is suitably determined in accordance with the target length of the honeycomb formed body 1 to be cut in the subsequent cutting step. However, when the length B of the cradle 7 is excessively long, there may be caused the trouble for supporting the honeycomb formed body 1 since the distance in the horizontal direction between the die 13 and horizontal conveying means such as the conveyor 17 is excessively long, and therefore the realistic length B of the cradle 7 is preferably from about 100 to 500 mm.

The cradle 7 is disposed so that a length direction thereof is the same as the extruding direction. Moreover, at the horizontal movement, the cradle 7 preferably moves horizontally in the extruding direction at the same speed as an extrusion speed. When the horizontal movement speed of the cradle 7 is the same as the extrusion speed, the honeycomb formed body 1 does not slide to the cradle 7, and therefore it is possible to prevent that the outer surface of the honeycomb formed body is damaged or deformed by friction due to the sliding.

It is preferable that means for supporting the honeycomb formed body 1 is not interposed between the die 13 and the cradle 7. In order to interpose the means for supporting the honeycomb formed body 1 other than the cradle 7 between the die 13 and the cradle 7, a space to dispose the means is required. Therefore, the distance in the horizontal direction between the die 13 and horizontal conveying means such as the conveyor 17 is excessively long, which may cause the trouble for supporting the honeycomb formed body 1. Moreover, an equipment to support the honeycomb formed body 1 is complicated.

In the present invention, examples of a method of the horizontal extrusion of the honeycomb formed body include a horizontal continuous extrusion method and a horizontal intermittent (ram) extrusion method. The horizontal continuous extrusion method is a method of directly forming a forming raw material into a kneaded material, and horizontally extruding the kneaded material to prepare a honeycomb formed body. Moreover, the horizontal ram extrusion method is a method of kneading a forming raw material by a kneader or the like, forming the resultant into a columnar kneaded material by a vacuum clay kneader, and horizontally extruding the kneaded material to prepare a honeycomb formed body. The horizontal continuous extrusion method can obtain higher production efficiency as compared with the horizontal ram extrusion method. Moreover, by using a continuous forming machine (a horizontal continuous forming machine) for the horizontal extrusion, a series of steps from the kneading of the forming raw material to the extrusion can be performed by a single device (the horizontal continuous forming machine).

(2) Honeycomb Formed Body:

FIG. 6 is a perspective view showing an example of the honeycomb formed body being a support object of the present invention. It is to be noted that the honeycomb formed body 1 shown in this drawing shows a state where the one is cut into a predetermined length in the cutting step after the extrusion. This honeycomb formed body 1 is formed by extruding the kneaded material obtained by kneading the forming raw material through the die in the horizontal direction, and has partition walls 3 defining a plurality of cells 2 extending in an extruding direction E at the extrusion.

There is not any restriction on the forming raw material of the honeycomb formed body 1, but examples of the forming raw material suitably include cordierite, a cordierite forming raw material, silicon carbide, and alumina. It is to be noted that "the cordierite forming raw material" is a ceramic raw material blended so as to have a chemical composition falling within the ranges of 42 to 56 mass % of silica, 30 to 45 mass % of alumina, and 12 to 16 mass % of magnesia. The cordierite forming raw material is fired to become cordierite.

Moreover, water as a dispersion medium is contained in the forming raw material. Furthermore, the forming raw material may contain a pore former, a binder, a surfactant and the like as needed. In particular, when the honeycomb formed body 1 is the one for use in manufacture of a filter such as a DPF, since a filter performance changes in accordance with a porosity or pore diameter after the firing, it is preferable to control the porosity or the pore diameter after the firing by containing the pore former in the forming raw material.

Examples of the binder suitably include methylcellulose, hydroxypropyl methylcellulose, hydroxypropoxyl cellulose, hydroxyethylcellulose, carboxymethylcellulose, and polyvinyl alcohol. Examples of the surfactant suitably include ethylene glycol, dextrin, fatty acid soap, and polyalcohol. Examples of the pore former preferably include graphite, starch, resin balloon, a water-absorbing resin, and silica gel.

The water as the dispersion medium is preferably contained in the forming raw material by adjusting so that the hardness of the kneaded material obtained by kneading the forming raw material is from 0.8 to 2.8 kgf. When the hardness of the kneaded material is in excess of 2.8 kgf, the kneaded material is excessively hard to decrease the extrusion speed during the extrusion, which may cause a problem in productivity. On the other hand, when the hardness of the kneaded material is smaller than 0.8 kgf, the kneaded material is excessively soft not to maintain a shape of the honeycomb formed body due to self-weight, which may lead to deformation. It is preferable that the hardness of the kneaded material is suitably selected in accordance with the cell structure, the outer diameter, a forming length or the like of the honeycomb formed body. It is to be noted that a value of "the hardness of the kneaded material" mentioned herein is measured on conditions that a penetrating jig shape: $\phi 5$ mm spherical, a penetration speed: 2 cm/min, and a penetration depth: 10 mm, by use of RT-2005D•D manufactured by Kabushiki Kaisha Rheotech as a measuring device.

A die (the die main body 14) for use in the extrusion of the honeycomb formed body 1 is provided with the slits 16 for forming partition wall portions of the honeycomb formed body 1. As the die (the die main body 14), there may be used a die having slits 16 of uniform widths, or a die having the slit 16 of wider widths in the vicinity of the peripheral portion compared with the widths of the slit 16 in the other portion. When the die (the die main body 14) having slit 16 of wider widths in the vicinity of peripheral portion compared with the widths of the slit 16 in the other portion is used, the honeycomb formed body 1 extruded through this die has a thicker thickness of the partition wall 3 in the vicinity of the peripheral portion compared with a thickness of the partition wall 3 in the other portion. In this way, by forming so that the thicknesses of the partition walls 3 only in the vicinity of the peripheral portion thicken, a strength of the honeycomb formed body 1 can be enhanced, and the deformation when the honeycomb formed body comes in contact with the cradle 7 can further be reduced.

It is to be noted that when a region to thicken the thicknesses of the partition walls 3 in the vicinity of the peripheral portion is excessively widened, a difference in extrusion speed from the partition wall 3 in the other portion increases, not to obtain a sound honeycomb formed body. Therefore, the region to thicken the thicknesses of the partition walls 3 is preferably a region of about three cells from the outer periphery towards the center of the honeycomb formed body 1.

There is not any restriction on the outer diameter of the honeycomb formed body 1, but the outer diameter is preferably 100 mm or more, more preferably 200 mm or more, and further preferably 300 mm or more. The supporting method of the present invention exerts an especially effective deformation suppressing effect with respect to the horizontal extrusion of the large honeycomb formed body having such a large outer diameter. In particular, the supporting method of the present invention exerts a remarkable deformation suppressing effect with respect to the horizontal extrusion of the large honeycomb formed body having the outer diameter of 100 to 450 mm and an open frontal area in a cross section perpendicular to an axial direction of 69 to 91%. Here, "the open frontal area" means a ratio of an open cross sectional area of the cells to total cross sectional area of the cells including a cross sectional area of the partition walls in the cross section perpendicular to the axial direction of the honeycomb formed body.

There is not any restriction on a cell shape of the honeycomb formed body 1 (the shape of the cells 2 in a cross section perpendicular to the axial direction of the honeycomb formed body 1), but the shape is preferably a polygonal shape such as a quadrangular shape, a hexagonal shape or an octagonal shape. Moreover, there is not any restriction on a shape of the honeycomb formed body 1, and examples of the shape include a columnar shape with round end faces, a columnar shape with oval end faces, and a columnar shape with end faces having a polygonal shape (a quadrangular shape, a pentangular shape, a hexagonal shape, a heptagonal shape, an octagonal shape or the like). It is to be noted that when the end faces have the oval or polygonal shape, a height in the vertical direction in the cross section perpendicular to the extruding direction of the honeycomb formed body at the extrusion corresponds to the outer diameter.

There is not any restriction on a use application of the honeycomb formed body 1, but the honeycomb formed body can suitably be used, for example, in manufacture of a carrier of a car exhaust gas purifying catalyst, in manufacture of a filter such as the DPF, or the like. It is to be noted that when it is used in the manufacture of the DPF, it is necessary to form plugged portions in one open end of each of the cells 2 after the drying or firing of the honeycomb formed body 1. With respect to the honeycomb formed body 1 after the drying or firing, the plugged portion is generally formed in the one open end of each of the cells 2 in such a pattern that one end face 5 and another end face 6 of the honeycomb formed body 1 form complementary checkered patterns.

As a method of forming the plugged portions in the cells, a heretofore known method can be used. An example of the method is specifically a method of firstly attaching a sheet to each end face of the honeycomb formed body after the drying or firing. Next, holes are made at positions of this sheet which correspond to the cells to be provided with the plugged portions. Next, the end face of the honeycomb formed body after the drying or firing is immersed into plugging slurry prepared by making the constituent materials of the plugged portions slurry in a state where this sheet is attached thereto, and the plugging slurry is filled into the open end of the cells to be plugged through the holes made in the sheet. The plugging slurry filled in this manner is dried, fired and then hardened, to form the plugged portions.

It is to be noted that when the cells collapsed by the buckling are present, it is difficult to normally form the plugged portions in the collapsed cells. Moreover, the honeycomb structure including the cells which are not normally provided with the plugged portions cannot satisfy product specifications, and becomes a defective product. However, as described above, when the supporting method of the present invention is used, since the incidence of buckling is reduced, there can easily be obtained the honeycomb formed body in which the buckling does not occur and the plugged portions can normally be formed. Moreover, even when the buckling occurs, since the portion of occurrence of buckling is more often the portion close to the outer periphery of the honeycomb formed body, there is a high possibility that the cells 2 which are not normally provided with the plugged portions due to the buckling can be removed by the outer periphery processing. Therefore, when the supporting method of the present invention is used to support the honeycomb formed body for use in the manufacture of the DPF, the honeycomb structure provided with the plugged portion can be manufactured in high yield rate.

EXAMPLES

Hereinafter, the present invention will further specifically be described based on examples, but the present invention is not limited to these examples.

Examples 1 to 3 and Comparative Examples 1 and 2

100 parts by mass of a cordierite forming raw material, 4 parts by mass of a binder (methylcellulose), 1 part by mass of a surfactant (fatty acid soap) and water were kneaded for one hour by a biaxial kneader, and defoamed by a vacuum clay kneader, to obtain a columnar kneaded material. Here, an amount of water used in the kneading was regulated to such an amount that a hardness of the kneaded material was 0.80 kgf. The obtained kneaded material was supplied to a ram type horizontal extrusion machine, and extruded through a die in a horizontal direction at an extrusion speed of 40 mm/s, to form columnar honeycomb formed bodies each having an outer diameter, a partition wall thickness, a cell density and an open frontal area shown in Table 1. As a die (a die main body), there was used a die having each slit of wider widths in the vicinity of a peripheral portion compared with widths of each slit in the other portion. Therefore, in each honeycomb formed body, a thickness of each partition wall only in the vicinity of the peripheral portion (a region of about three cells from the outer periphery to the center of each honeycomb formed body) thickened compared with the thickness of each partition wall in the other portion. Specifically, the thickness of each partition wall in the vicinity of the peripheral portion of the honeycomb formed body was about 1.5 times the thickness of each partition wall in the other portion.

Each honeycomb formed body extruded through the die was supported by a cradle having a length of 100 mm at a downstream position of the die in an extruding direction. The cradle had a supporting surface which came in contact with a peripheral surface of the honeycomb formed body, and the supporting surface was formed along a shape of a cross section perpendicular to an axial direction of the honeycomb formed body. Moreover, the cradle moved horizontally in the extruding direction after lifting from a position below the die at the downstream position of the die. The horizontal movement of the cradle was performed by a roller conveyor so that a speed of the horizontal movement was the same as the extrusion speed. Furthermore, the lowermost end of the supporting surface of the cradle was located below the lowermost end of the honeycomb formed body immediately after extruded through the die during the horizontally movement, and drop values are shown in Table 1. Here, the drop values in the table were measured when a distance in the horizontal direction between the die and the cradle was 200 mm.

Each honeycomb formed body supported by the cradle as described above was conveyed to a predetermined position downstream in the extruding direction, and then cut by a wire so that a length thereof in the axial direction (the extruding direction) was 100 mm. Afterward, each cut honeycomb formed body was dried, to obtain honeycomb dried body. As a specific drying method, firstly, dielectric drying was performed until a drying ratio of moisture of the honeycomb formed body obtained in terms of the following equation was 90%, and then hot air drying at 120° C. by hot air was performed until the drying ratio became 100%.

Drying ratio(%)=(a mass before the drying–a mass after the drying)/the mass before the drying×100

Next, each obtained honeycomb dried body was subjected to finish processing, and then fired at 1430° C. under an oxidation atmosphere, to obtain honeycomb structures of Examples 1 to 3 and Comparative Examples 1 and 2. The contour of Examples 1 to 3 and Comparative Examples 1 and 2 was measured by the following method, and an average value thereof (an average contour) is shown in Table 1.

It is to be noted that "the contour" means an amount of a deviation of an actual contour from a geometric contour determined by a theoretically accurate dimension. Therefore, the contour measured in the present example is an amount of an outer diameter deviation of the honeycomb structure from a basic outer diameter. By measuring such a contour, the shape accuracy of the honeycomb structure can be evaluated.

[Measuring Method of Contour]

Figure 7:
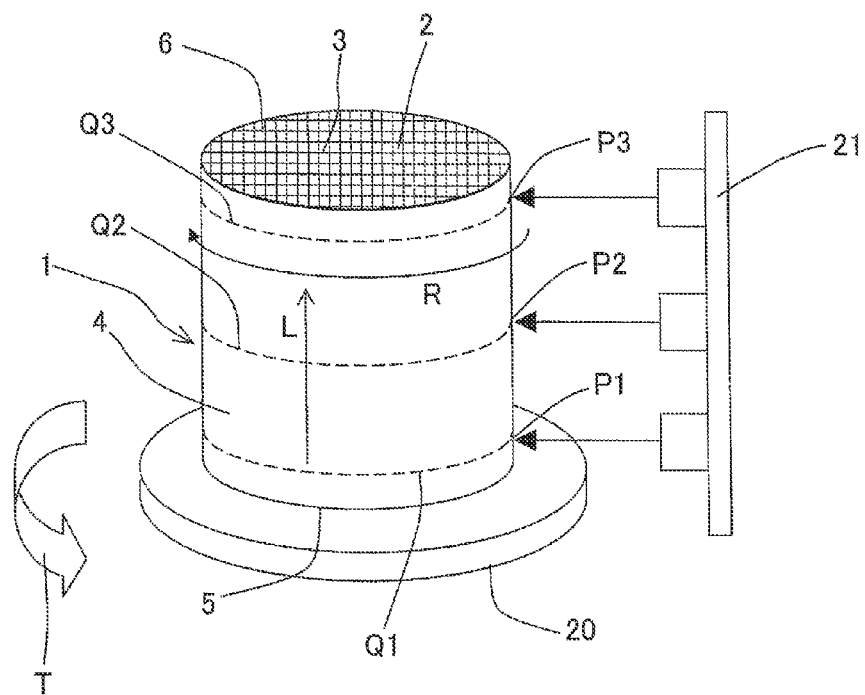
FIG. 7 is a perspective view schematically showing a measuring method of a contour.

As shown in FIG. 7, a honeycomb structure was disposed on a measurement stand 20 rotatable in a horizontal plane, and a contour of the honeycomb structure was measured in each of "contour measuring portions Q1, Q2 and Q3" of the surface of a peripheral wall 4 of the honeycomb structure. "The contour measuring portions Q1, Q2 and Q3" corresponds to each of portions "including each of three measurement start positions P1, P2 and P3 apart from each other in "a direction L from one end face 5 to another end face 6", and going around the peripheral surface in direction R each of the contour measuring portions. The contour was continuously measured by a laser displacement meter 21 while rotating the measurement stand 20 disposing on the honeycomb structure in a rotating direction T. As the laser displacement meter 21, a reflective type non-contact laser displacement meter was used. To measure the contour, 3000 points were measured in each of the contour measuring portions. Specifically, the contour of the surface of the peripheral wall 4 of the honeycomb structure in each point on the contour measuring portion was measured every 0.12° from each contour measurement reference position (the measurement start position). The measurement of the contour was carried out at normal temperature (20° C.). An average value of the contour (the average contour) was calculated from thus obtained measurement result.

Examples 4 to 6 and Comparative Examples 3 and 4

100 parts by mass of a cordierite forming raw material, 6 parts by mass of a binder (methylcellulose), 1 part by mass of a surfactant (fatty acid soap) and water were supplied into a biaxial horizontal continuous forming machine, and this supplied raw material was kneaded in the forming machine, to obtain a kneaded material. Here, a supplied amount of the water was adjusted so that a hardness of the kneaded material was 1.05 kgf. This kneaded material was extruded through a die disposed in the forming machine at an extrusion speed of 40 mm/s in a horizontal direction, to form columnar honeycomb formed bodies each having the same outer diameter, partition wall thickness, cell density and open frontal area as in the honeycomb formed bodies formed in Examples 1 to 3 and Comparative Examples 1 and 2. As a die, there was used a die having each slit of wider widths in the vicinity of a peripheral portion compared with widths of each slit in the other portion in the same as in the die used in Examples 1 to 3 and Comparative Examples 1 and 2.

Each honeycomb formed body extruded through this die was supported by a cradle with a drop value shown in Table 1 in the same manner as in Examples 1 to 3 and Comparative Examples 1 and 2. As to each honeycomb formed body supported by the cradle as described above, cutting, drying, finish processing and firing were performed in the same manner as in Examples 1 to 3 and Comparative Examples 1 and 2, to obtain honeycomb structures of Examples 4 to 6 and Comparative Examples 3 and 4. As to these honeycomb structures of, the contour of Examples 4 to 6 and Comparative Examples 3 and 4 was measured by the above method, and an average value thereof (an average contour) is shown in Table 1.

Examples 7 to 9 and Comparative Examples 5 and 6

In the same manner as in Examples 1 to 3 and Comparative Examples 1 and 2, columnar honeycomb formed bodies each having an outer diameter, partition wall thickness, cell density and open frontal area as shown in Table 1 were extruded. Each honeycomb formed body extruded through a die by this extrusion was supported by a cradle with a drop value shown in Table 1 in the same manner as in Examples 1 to 3 and Comparative Examples 1 and 2 except that the cradle having a length of 175 mm was used. Each honeycomb formed body supported by the cradle as described above was conveyed to a predetermined position downstream in an extruding direction, and then cut by a wire so that a length thereof in an axial direction (an extruding direction) was 175 mm. Afterward, as to each cut honeycomb formed body, drying, finish processing and firing were performed in the same manner as in Examples 1 to 3 and Comparative Examples 1 and 2, to obtain honeycomb structures of Examples 7 to 9 and Comparative Examples 5 and 6. The contour of Examples 7 to 9 and Comparative Examples 5 and 6 was measured by the above method, and an average value thereof (an average contour) is shown in Table 1.

Examples 10 to 12 and Comparative Examples 7 and 8

In the same manner as in Examples 4 to 6 and Comparative Examples 3 and 4, honeycomb formed bodies each having the same outer diameter, partition wall thickness, cell density and open frontal area as in the honeycomb formed bodies formed in Examples 7 to 9 and Comparative Examples 5 and 6 were extruded. Each honeycomb formed body extruded through a die by this extrusion was supported by a cradle with a drop value shown in Table 1 in the same manner as in Examples 7 to 9 and Comparative Examples 5 and 6. As to each honeycomb formed body supported by the cradle as described above, cutting, drying, finish processing and firing were performed in the same manner as in Examples 7 to 9 and Comparative Examples 5 and 6, to obtain honeycomb structures of Examples 10 to 12 and Comparative Examples 7 and 8. The contour of Examples 10 to 12 and Comparative Examples 7 and 8 was measured by the above method, and an average value thereof (an average contour) is shown in Table 1.

Examples 13 to 15 and Comparative Examples 9 and 10

Columnar honeycomb formed bodies each having an outer diameter, partition wall thickness, cell density and open frontal area as shown in Table 2 were formed in the same manner as in Examples 4 to 6 and Comparative Examples 3 and 4 except that a supplied amount of water was adjusted so that a hardness of a kneaded material was 1.35 kgf, and an extrusion speed was 30 mm/s. Each honeycomb formed body extruded through a die by this extrusion was supported by a cradle with a drop value shown in Table 2 in the same manner as in Examples 7 to 9 and Comparative Examples 5 and 6. As to each honeycomb formed body supported by the cradle as described above, cutting, drying, finish processing and firing were performed in the same manner as in Examples 7 to 9 and Comparative Examples 5 and 6, to obtain honeycomb structures of Examples 13 to 15 and Comparative Examples 9 and 10. As to these honeycomb structures of Examples 13 to 15 and Comparative Examples 9 and 10, contour was measured by the above method, and an average value thereof (an average contour) is shown in Table 2.

Examples 16 to 18 and Comparative Examples 11 and 12

Columnar honeycomb formed bodies each having an outer diameter, partition wall thickness, cell density and open frontal area as shown in Table 2 were formed in the same manner as in Examples 4 to 6 and Comparative Examples 3 and 4 except that a supplied amount of water was adjusted so that a hardness of a kneaded material was 1.22 kgf, and an extrusion speed was 30 mm/s. Each honeycomb formed body extruded through a die by this extrusion was supported by a cradle with a drop value shown in Table 2 in the same manner as in Examples 1 to 3 and Comparative Examples 1 and 2 except that the cradle having a length of 200 mm was used. Here, the drop values shown in the table were measured when a distance in a horizontal direction between the die and the cradle was 350 mm. Each honeycomb formed body supported by the cradle as described above was conveyed to a predetermined position downstream in an extruding direction, and then cut by a wire so that a length thereof in an axial direction (the extruding direction) was 200 mm. Afterward, as to each cut honeycomb formed body, drying, finish processing and firing were performed in the same manner as in Examples 1 to 3 and Comparative Examples 1 and 2, to obtain honeycomb structures of Examples 16 to 18 and Comparative Examples 11 and 12. The contour of Examples 16 to 18 and Comparative Examples 11 and 12 was measured by the above method, and an average value thereof (an average contour) is shown in Table 2.

Examples 19 to 21 and Comparative Examples 13 and 14

Columnar honeycomb formed bodies each having an outer diameter, partition wall thickness, cell density and open frontal area as shown in Table 2 were formed in the same manner as in Examples 4 to 6 and Comparative Examples 3 and 4 except that a supplied amount of water was adjusted so that a hardness of a kneaded material was 1.48 kgf, and an extrusion speed was 15 mm/s. Here, as a die (a die main body), there was used a die having slits of uniform widths. Each honeycomb formed body extruded through the die by this extrusion was supported by a cradle with a drop value shown in Table 2 in the same manner as in Examples 16 to 18 and Comparative Examples 11 and 12. As to each honeycomb formed body supported by the cradle as described above, cutting, drying, finish processing and firing were performed in the same manner as in Examples 16 to 18 and Comparative Examples 11 and 12, to obtain honeycomb structures of Examples 19 to 21 and Comparative Examples 13 and 14. The contour of Examples 19 to 21 and Comparative Examples 13 and 14 was measured by the above method, and an average value thereof (an average contour) is shown in Table 2.

TABLE 1

| | Outer diameter of formed body (mm) | Length of formed body (mm) | Partition wall thickness (μm) | Cell density (cells/cm$^2$) | Open frontal area (%) | Die slit *1 | Hardness of kneaded material (kgf) | Forming method *2 | Extrusion speed (mm/s) | Drop measurement position *3 (mm) | Drop value (mm) | Average contour (mm) |
|---|---|---|---|---|---|---|---|---|---|---|---|---|
| Comparative Example 1 | 100 | 100 | 50 | 93 | 90.9 | W | 0.80 | Horizontal ram | 40 | 200 | 2 | 0.45 |
| Example 1 | 100 | 100 | 50 | 93 | 90.9 | W | 0.80 | Horizontal ram | 40 | 200 | 5 | 0.39 |
| Example 2 | 100 | 100 | 50 | 93 | 90.9 | W | 0.80 | Horizontal ram | 40 | 200 | 10 | 0.37 |
| Example 3 | 100 | 100 | 50 | 93 | 90.9 | W | 0.80 | Horizontal ram | 40 | 200 | 15 | 0.41 |
| Comparative Example 2 | 100 | 100 | 50 | 93 | 90.9 | W | 0.80 | Horizontal ram | 40 | 200 | 20 | 0.42 |
| Comparative Example 3 | 100 | 100 | 50 | 93 | 90.9 | W | 1.05 | Horizontal continuous | 40 | 200 | 2 | 0.42 |
| Example 4 | 100 | 100 | 50 | 93 | 90.9 | W | 1.05 | Horizontal continuous | 40 | 200 | 5 | 0.32 |
| Example 5 | 100 | 100 | 50 | 93 | 90.9 | W | 1.05 | Horizontal continuous | 40 | 200 | 10 | 0.30 |
| Example 6 | 100 | 100 | 50 | 93 | 90.9 | W | 1.05 | Horizontal continuous | 40 | 200 | 15 | 0.37 |
| Comparative Example 4 | 100 | 100 | 50 | 93 | 90.9 | W | 1.05 | Horizontal continuous | 40 | 200 | 20 | 0.40 |
| Comparative Example 5 | 150 | 175 | 50 | 140 | 89.0 | W | 0.80 | Horizontal ram | 40 | 300 | 2 | 0.48 |
| Example 7 | 150 | 175 | 50 | 140 | 89.0 | W | 0.80 | Horizontal ram | 40 | 300 | 5 | 0.41 |
| Example 8 | 150 | 175 | 50 | 140 | 89.0 | W | 0.80 | Horizontal ram | 40 | 300 | 10 | 0.39 |
| Example 9 | 150 | 175 | 50 | 140 | 89.0 | W | 0.80 | Horizontal ram | 40 | 300 | 15 | 0.43 |

TABLE 1-continued

| | Outer diameter of formed body (mm) | Length of formed body (mm) | Partition wall thickness (μm) | Cell density (cells/cm$^2$) | Open frontal area (%) | Die slit *1 | Hardness of kneaded material (kgf) | Forming method *2 | Extrusion speed (mm/s) | Drop measurement position *3 (mm) | Drop value (mm) | Average contour (mm) |
|---|---|---|---|---|---|---|---|---|---|---|---|---|
| Comparative Example 6 | 150 | 175 | 50 | 140 | 89.0 | W | 0.80 | Horizontal ram | 40 | 300 | 20 | 0.45 |
| Comparative Example 7 | 150 | 175 | 50 | 140 | 89.0 | W | 1.05 | Horizontal continuous | 40 | 300 | 2 | 0.45 |
| Example 10 | 150 | 175 | 50 | 140 | 89.0 | W | 1.05 | Horizontal continuous | 40 | 300 | 5 | 0.34 |
| Example 11 | 150 | 175 | 50 | 140 | 89.0 | W | 1.05 | Horizontal continuous | 40 | 300 | 10 | 0.32 |
| Example 12 | 150 | 175 | 50 | 140 | 89.0 | W | 1.05 | Horizontal continuous | 40 | 300 | 15 | 0.39 |
| Comparative Example 8 | 150 | 175 | 50 | 140 | 89.0 | W | 1.05 | Horizontal continuous | 40 | 300 | 20 | 0.43 |

*1: "W" means that a width of each slit in the vicinity of a peripheral portion is wider than a width of each slit in the other portion.
*2: "Horizontal ram" means a horizontal intermittent (ram) extrusion method, and "horizontal continuous" means a horizontal continuous extrusion method.
*3: "Drop measurement position" means a distance in a horizontal direction between a die and a cradle when a drop value is measured.

TABLE 2

| | Outer diameter of formed body (mm) | Length of formed body (mm) | Partition wall thickness (μm) | Cell density (cells/cm$^2$) | Open frontal area (%) | Die slit *1 | Hardness of kneaded material (kgf) | Forming method *2 | Extrusion speed (mm/s) | Drop measurement position *3 (mm) | Drop value (mm) | Average contour (mm) |
|---|---|---|---|---|---|---|---|---|---|---|---|---|
| Comparative Example 9 | 200 | 175 | 75 | 62 | 89.0 | W | 1.35 | Horizontal continuous | 30 | 300 | 2 | 0.52 |
| Example 13 | 200 | 175 | 75 | 62 | 89.0 | W | 1.35 | Horizontal continuous | 30 | 300 | 5 | 0.48 |
| Example 14 | 200 | 175 | 75 | 62 | 89.0 | W | 1.35 | Horizontal continuous | 30 | 300 | 10 | 0.46 |
| Example 15 | 200 | 175 | 75 | 62 | 89.0 | W | 1.35 | Horizontal continuous | 30 | 300 | 15 | 0.50 |
| Comparative Example 10 | 200 | 175 | 75 | 62 | 89.0 | W | 1.35 | Horizontal continuous | 30 | 300 | 20 | 0.52 |
| Comparative Example 11 | 250 | 200 | 100 | 62 | 85.7 | W | 1.22 | Horizontal continuous | 30 | 350 | 2 | 0.75 |
| Example 16 | 250 | 200 | 100 | 62 | 85.7 | W | 1.22 | Horizontal continuous | 30 | 350 | 5 | 0.47 |
| Example 17 | 250 | 200 | 100 | 62 | 85.7 | W | 1.22 | Horizontal continuous | 30 | 350 | 10 | 0.51 |
| Example 18 | 250 | 200 | 100 | 62 | 85.7 | W | 1.22 | Horizontal continuous | 30 | 350 | 15 | 0.55 |
| Comparative Example 12 | 250 | 200 | 100 | 62 | 85.7 | W | 1.22 | Horizontal continuous | 30 | 350 | 20 | 0.67 |
| Comparative Example 13 | 300 | 200 | 150 | 62 | 79.7 | S | 1.48 | Horizontal continuous | 15 | 350 | 2 | 1.05 |
| Example 19 | 300 | 200 | 150 | 62 | 79.7 | S | 1.48 | Horizontal continuous | 15 | 350 | 5 | 0.82 |
| Example 20 | 300 | 200 | 150 | 62 | 79.7 | S | 1.48 | Horizontal continuous | 15 | 350 | 10 | 0.75 |
| Example 21 | 300 | 200 | 150 | 62 | 79.7 | S | 1.48 | Horizontal continuous | 15 | 350 | 15 | 0.80 |
| Comparative Example 14 | 300 | 200 | 150 | 62 | 79.7 | S | 1.48 | Horizontal continuous | 15 | 350 | 20 | 0.98 |

*1: "W" means that a width of each slit in the vicinity of a peripheral portion is wider than a width of each slit in the other portion.
*2: "Horizontal continuous" means a horizontal continuous extrusion method.
*3: "Drop measurement position" means a distance in a horizontal direction between a die and a cradle when a drop value is measured.

(Consideration 1)

As shown in Table 1 and Table 2, when the examples and comparative examples having the same conditions other than the drop values are compared, it is seen that the examples in which a drop value is from 5 to 15 mm have a smaller average contour value and a higher shape accuracy than the comparative examples in which the drop value is smaller than 5 mm or in excess of 15 mm.

Examples 22 to 26 and Comparative Examples 15 and 16

Columnar honeycomb formed bodies each having an outer diameter, partition wall thickness, cell density and open frontal area as shown in Table 3 were formed in the same manner as in Examples 4 to 6 and Comparative Examples 3 and 4 except that an supplied amount of water was adjusted so that a hardness of a kneaded material was 1.22 kgf, and an extrusion speed was 20 mm/s. Here, as a die (a die main body), there was used a die having slits of uniform widths. Each honeycomb formed body extruded through the die by this extrusion was supported by a cradle with a drop value shown in Table 3 in the same manner as in Examples 16 to 18 and Comparative Examples 11 and 12. As to each honeycomb formed body supported by the cradle as described above, cutting, drying and finish processing were performed in the same manner as in Examples 16 to 18 and Comparative Examples 11 and 12. Next, as to each honeycomb dried body after the finish processing (a finished honeycomb dried body), an incidence of buckling was determined by the following method, and the results are shown in Table 3.

Next, each finished honeycomb dried body was fired at 1430° C. under an oxidation atmosphere to obtain a honeycomb fired body, and this honeycomb fired body was subjected to outer periphery processing by cam grinding, to obtain honeycomb structures of Examples 22 to 26 and Comparative Examples 15 and 16. The outer periphery processing was performed so that an outer diameter after the outer periphery processing was 90% of an outer diameter before the outer periphery processing. As to each of thus obtained honeycomb structures of Examples 22 to 26 and Comparative Examples 15 and 16, yield rate was determined by the following method, and the results are shown in Table 3.

[Incidence of Buckling]

In each of the examples and comparative examples, 100 finished honeycomb dried bodies were prepared, and it was checked by visual observation whether or not buckling (collapse of the cell) occurred in the finished honeycomb dried bodies. Then, a rate of the finished honeycomb dried bodies where the buckling occurred with respect to all the finished honeycomb dried bodies (100 bodies) subjected to the visual observation was defined as the incidence of buckling.

[Yield Rate]

In each of the examples and comparative examples, 100 honeycomb structures (obtained by the outer periphery processing of the above finished honeycomb dried bodies after the firing) were prepared, and it was checked by visual observation whether or not the buckling occurred. Then, a rate of the honeycomb structures where the buckling did not occur with respect to all the honeycomb structures (100 structures) subjected to the visual observation was obtained as the yield rate. Here, "the honeycomb structures where the buckling did not occur" includes structures where the occurrence of the buckling was recognized at the visual observation of the above finished honeycomb dried bodies, but it was possible to remove the portions of occurrence of buckling by the outer periphery processing after the firing.

Examples 27 to 31 and Comparative Examples 17 and 18

Columnar honeycomb formed bodies each having an outer diameter, partition wall thickness, cell density and open frontal area as shown in Table 3 were formed in the same manner as in Examples 22 to 26 and Comparative Examples 15 and 16 except that a supplied amount of water was adjusted so that a hardness of the kneaded material hardness was 1.63 kgf, and an extrusion speed was 15 mm/s. Each honeycomb formed body extruded through a die by this extrusion was supported by a cradle with a drop value shown in Table 3 in the same manner as in Examples 1 to 3 and Comparative Examples 1 and 2 except that the cradle having a length of 176 mm was used. Here, the drop values shown in the table were measured when a distance in a horizontal direction between the die and the cradle was 350 mm. Each honeycomb formed body supported by the cradle as described above was conveyed to a predetermined position downstream in an extruding direction, and then cut by a wire so that a length thereof in an axial direction (the extruding direction) was 176 mm. Afterward, as to each cut honeycomb formed body, drying and finish processing were performed in the same manner as in Examples 1 to 3 and Comparative Examples 1 and 2. Next, as to each honeycomb dried body after the finish processing (a finished honeycomb dried body), an incidence of buckling was determined by the above method, and the results are shown in Table 3. Next, as to each finished honeycomb dried body, firing and outer periphery processing were performed in the same manner as in Examples 22 to 26 and Comparative Examples 15 and 16, to obtain honeycomb structures of Examples 27 to 31 and Comparative Examples 17 and 18. As to each of thus obtained honeycomb structures of Examples 27 to 31 and Comparative Examples 17 and 18, yield rate was determined by the above method, and the results are shown in Table 3.

Examples 32 to 34 and Comparative Examples 19 and 20

Columnar honeycomb formed bodies each having an outer diameter, partition wall thickness, cell density and open frontal area as shown in Table 4 were formed in the same manner as in Examples 22 to 26 and Comparative Examples 15 and 16 except that a supplied amount of water was adjusted so that a hardness of the kneaded material was 2.28 kgf, and an extrusion speed was 12 mm/s. Each honeycomb formed body extruded through a die by this extrusion was supported by a cradle with a drop value shown in Table 4 in the same manner as in Examples 27 to 31 and Comparative Examples 17 and 18. As to each honeycomb formed body supported by the cradle as described above, cutting, drying and finish processing were performed in the same manner as in Examples 27 to 31 and Comparative Examples 17 and 18. Next, as to each honeycomb dried body after the finish processing (a finished honeycomb dried body), an incidence of buckling was determined by the above method, and the results are shown in Table 4. Next, as to each finished honeycomb dried body, firing and outer periphery processing were performed in the same manner as in Examples 22 to 26 and Comparative Examples 15 and 16, to obtain honeycomb structures of Examples 32 to 34 and Comparative Examples 19 and 20. As to each of thus obtained honeycomb structures of Examples 32 to 34 and Comparative Examples 19 and 20, yield rate was determined by the above method, and the results are shown in Table 4.

Examples 35 to 37 and Comparative Examples 21 and 22

Columnar honeycomb formed bodies each having an outer diameter, partition wall thickness, cell density and open frontal area as shown in Table 4 were formed in the same manner as in Examples 22 to 26 and Comparative Examples 15 and 16 except that a supplied amount of water was adjusted so that a hardness of the kneaded material was 2.10 kgf, and an extrusion speed was 12 mm/s. Each honeycomb formed body extruded through a die by this extrusion was supported by a cradle with a drop value shown in Table 4 in the same manner as in Examples 1 to 3 and Comparative Examples 1 and 2 except that the cradle having a length of 120 mm was used. Here, the drop values shown in the table ware measured when a distance in a horizontal direction between the die and the cradle was 250 mm. Each honeycomb formed body supported by the cradle as described above was conveyed to a predetermined position downstream in an extruding direction, and then cut by a wire so that a length thereof in an axial direction (the extruding direction) was 120 mm. Afterward, as to each cut honeycomb formed body, drying and finish processing were performed in the same manner as in Examples 1 to 3 and Comparative Examples 1 and 2. Next, as to each honeycomb dried body after the finish processing (a finished honeycomb dried body), an incidence of buckling was determined by the above method, and the results are shown in Table 4. Next, as to each finished honeycomb dried body, firing and outer periphery processing were performed in the same manner as in Examples 22 to 26 and Comparative Examples 15 and 16, to obtain honeycomb structures of Examples 35 to 37 and Comparative Examples 21 and 22. As to each of thus obtained honeycomb structures of Examples 35 to 37 and Comparative Examples 21 and 22, yield rate was determined by the above method, and the results are shown in Table 4.

Examples 38 to 40 and Comparative Examples 23 and 24

Columnar honeycomb formed bodies each having an outer diameter, partition wall thickness, cell density and open frontal area as shown in Table 4 were formed in the same manner as in Examples 22 to 26 and Comparative Examples 15 and 16 except that a supplied amount of water was adjusted so that a hardness of the kneaded material was 2.81 kgf, and an extrusion speed was 10 mm/s. Each honeycomb formed body extruded through a die by this extrusion was supported by a cradle with a drop value shown in Table 4 in the same manner as in Examples 35 to 37 and Comparative Examples 21 and 22. As to each cut honeycomb formed body supported by the cradle as described above, cutting, drying and finish processing were performed in the same manner as in Examples 35 to 37 and Comparative Examples 21 and 22. Next, as to each honeycomb dried body after the finish processing (a finished honeycomb dried body), an incidence of buckling was determined by the above method, and the results are shown in Table 4. Next, as to each finished honeycomb dried body, firing and outer periphery processing were performed in the same manner as in Examples 22 to 26 and Comparative Examples 15 and 16, to obtain honeycomb structures of Examples 38 to 40 and Comparative Examples 23 and 24. As to each of thus obtained honeycomb structures of Examples 38 to 40 and Comparative Examples 23 and 24, yield rate was determined by the above method, and the results are shown in Table 4.

TABLE 3

| | Outer diameter of formed body (mm) | Length of formed body (mm) | Partition wall thickness (μm) | Cell density (cells/cm$^2$) | Open frontal area (%) | Die slit *1 | Hardness of Kneaded material (kgf) | Forming method *2 | Extrusion speed (mm/s) | Drop measurement position *3 (mm) | Drop value (mm) | Incidence of Buckling (%) | Yield Rate (%) |
|---|---|---|---|---|---|---|---|---|---|---|---|---|---|
| Comparative Example 15 | 300 | 200 | 100 | 62 | 85.7 | S | 1.22 | Horizontal continuous | 20 | 300 | 2 | 100 | 40 |
| Example 22 | 300 | 200 | 100 | 62 | 85.7 | S | 1.22 | Horizontal continuous | 20 | 300 | 5 | 2 | 100 |
| Example 23 | 300 | 200 | 100 | 62 | 85.7 | S | 1.22 | Horizontal continuous | 20 | 300 | 8 | 0 | 100 |
| Example 24 | 300 | 200 | 100 | 62 | 85.7 | S | 1.22 | Horizontal continuous | 20 | 300 | 10 | 0 | 100 |
| Example 25 | 300 | 200 | 100 | 62 | 85.7 | S | 1.22 | Horizontal continuous | 20 | 300 | 12 | 0 | 100 |
| Example 26 | 300 | 200 | 100 | 62 | 85.7 | S | 1.22 | Horizontal continuous | 20 | 300 | 15 | 3 | 100 |
| Comparative Example 16 | 300 | 200 | 100 | 62 | 85.7 | S | 1.22 | Horizontal continuous | 20 | 300 | 20 | 100 | 35 |
| Comparative Example 17 | 350 | 176 | 125 | 46.5 | 84.7 | S | 1.63 | Horizontal continuous | 15 | 350 | 2 | 100 | 34 |
| Example 27 | 350 | 176 | 125 | 46.5 | 84.7 | S | 1.63 | Horizontal continuous | 15 | 350 | 5 | 3 | 100 |
| Example 28 | 350 | 176 | 125 | 46.5 | 84.7 | S | 1.63 | Horizontal continuous | 15 | 350 | 8 | 0 | 100 |
| Example 29 | 350 | 176 | 125 | 46.5 | 84.7 | S | 1.63 | Horizontal continuous | 15 | 350 | 10 | 0 | 100 |
| Example 30 | 350 | 176 | 125 | 46.5 | 84.7 | S | 1.63 | Horizontal continuous | 15 | 350 | 12 | 0 | 100 |
| Example 31 | 350 | 176 | 125 | 46.5 | 84.7 | S | 1.63 | Horizontal continuous | 15 | 350 | 15 | 4 | 100 |
| Comparative Example 18 | 350 | 176 | 125 | 46.5 | 84.7 | S | 1.63 | Horizontal continuous | 15 | 350 | 20 | 100 | 36 |

*1: "S" means that the widths of all the slits are uniform.
*2: "Horizontal continuous" means a horizontal continuous extrusion method.
*3: "Drop measurement position" means a distance in a horizontal direction between a die and a cradle when a drop value is measured.

TABLE 4

| | Outer diameter of formed body (mm) | Length of formed body (mm) | Partition wall thickness (μm) | Cell density (cells/cm²) | Open frontal area (%) | Die slit *1 | Hardness of Kneaded material (kgf) | Forming method *2 | Extrusion speed (mm/s) | Drop measurement position *3 (mm) | Drop value (mm) | Incidence of Buckling (%) | Yield Rate (%) |
|---|---|---|---|---|---|---|---|---|---|---|---|---|---|
| Comparative Example 19 | 350 | 176 | 75 | 62 | 89.0 | S | 2.28 | Horizontal continuous | 12 | 350 | 2 | 100 | 23 |
| Example 32 | 350 | 176 | 75 | 62 | 89.0 | S | 2.28 | Horizontal continuous | 12 | 350 | 5 | 3 | 100 |
| Example 33 | 350 | 176 | 75 | 62 | 89.0 | S | 2.28 | Horizontal continuous | 12 | 350 | 10 | 0 | 100 |
| Example 34 | 350 | 176 | 75 | 62 | 89.0 | S | 2.28 | Horizontal continuous | 12 | 350 | 15 | 4 | 100 |
| Comparative Example 20 | 350 | 176 | 75 | 62 | 89.0 | S | 2.28 | Horizontal continuous | 12 | 350 | 20 | 100 | 25 |
| Comparative Example 21 | 400 | 120 | 125 | 46.5 | 84.7 | S | 2.10 | Horizontal continuous | 12 | 250 | 2 | 100 | 26 |
| Example 35 | 400 | 120 | 125 | 46.5 | 84.7 | S | 2.10 | Horizontal continuous | 12 | 250 | 5 | 5 | 100 |
| Example 36 | 400 | 120 | 125 | 46.5 | 84.7 | S | 2.10 | Horizontal continuous | 12 | 250 | 10 | 0 | 100 |
| Example 37 | 400 | 120 | 125 | 46.5 | 84.7 | S | 2.10 | Horizontal continuous | 12 | 250 | 15 | 7 | 100 |
| Comparative Example 22 | 400 | 120 | 125 | 46.5 | 84.7 | S | 2.10 | Horizontal continuous | 12 | 250 | 20 | 100 | 21 |
| Comparative Example 23 | 450 | 120 | 150 | 62 | 79.7 | S | 2.81 | Horizontal continuous | 10 | 250 | 2 | 100 | 10 |
| Example 38 | 450 | 120 | 150 | 62 | 79.7 | S | 2.81 | Horizontal continuous | 10 | 250 | 5 | 7 | 100 |
| Example 39 | 450 | 120 | 150 | 62 | 79.7 | S | 2.81 | Horizontal continuous | 10 | 250 | 10 | 0 | 100 |
| Example 40 | 450 | 120 | 150 | 62 | 79.7 | S | 2.81 | Horizontal continuous | 10 | 250 | 15 | 9 | 100 |
| Comparative Example 24 | 450 | 120 | 150 | 62 | 79.7 | S | 2.81 | Horizontal continuous | 10 | 250 | 20 | 100 | 15 |

*1: "S" means that the widths of all the slits are uniform.
*2: "Horizontal continuous" means a horizontal continuous extrusion method.
*3: "Drop measurement position" means a distance in a horizontal direction between a die and a cradle when a drop value is measured.

(Consideration 2)

As shown in Table 3 and Table 4, when the examples and comparative examples having the same conditions other than the drop values are compared, it is seen that the examples in which a drop value is from 5 to 15 mm have a remarkably lower incidence of buckling than the comparative examples in which the drop value is smaller than 5 mm or in excess of 15 mm. In particular, in the examples in which the drop values were from 8 to 12 mm, the occurrence of the buckling was not recognized at all. Moreover, the yield rate of the comparative examples in which the drop values were smaller than 5 mm or in excess of 15 mm was from about 10 to 40%, whereas the yield rate of the example in which the drop value was from 5 to 15 mm was 100%.

Examples 41 to 43 and Comparative Examples 25 and 26

100 parts by mass of a cordierite forming raw material, 5 parts by mass of a binder (methylcellulose), 1 part by mass of a surfactant (fatty acid soap), 6 parts by mass of a pore former (graphite) and water were supplied into a biaxial horizontal continuous forming machine, and the supplied raw material was kneaded in the forming machine, to obtain a kneaded material. Here, a supplied amount of the water was adjusted so that a hardness of the kneaded material was 1.23 kgf. This kneaded material was extruded through a die disposed in the forming machine at an extrusion speed of 7 mm/s in a horizontal direction, to form columnar honeycomb formed bodies each having an outer diameter, partition wall thickness, cell density and open frontal area as shown in Table 5. Moreover, as a die (a die main body), there was used a die having slits of uniform width.

Each honeycomb formed body extruded through the die by this extrusion was supported by a cradle with a drop value shown in Table 5 in the same manner as in Examples 1 to 3 and Comparative Examples 1 and 2 except that the cradle having a length of 480 mm was used. Here, the drop value was measured when a distance in the horizontal direction between the die and the cradle was 580 mm. Each honeycomb formed body supported by the cradle as described above was conveyed to a predetermined position downstream in an extruding direction, and then cut by a wire so that a length thereof in an axial direction (the extruding direction) was 480 mm. Afterward, as to each cut honeycomb formed body, drying and finish processing were performed in the same manner as in Examples 1 to 3 and Comparative Examples 1 and 2. Next, as to each honeycomb dried body after the finish processing (a finished honeycomb dried body), an incidence of buckling was determined by the above method, and the results are shown in Table 5.

Next, a plugged portion was formed at one open end of each of cells of each finished honeycomb dried body. The plugged portions were formed in such a pattern that one end face and another end face of the finished honeycomb dried body formed complementary checkered patterns. As a method for forming the plugged portions, a sheet was firstly attached to each end face of the finished honeycomb dried body. Next, holes were made at positions of this sheet which corresponded to the cells to be provided with the plugged portions. Next, the end face of the finished honeycomb dried body was immersed into a plugging slurry prepared by making the constituent materials of the plugged portions slurry, in a state where this sheet was attached to the end face, to fill the plugging slurry into the open end of the cells to be plugged through the holes made in the sheet. Here, as the constituent materials of the plugged portions, a cordierite forming raw material was used.

In this way, after drying the plugging slurry filled into the open frontal areas of the cells, the finished honeycomb dried body was subjected to firing and outer periphery processing in the same manner as in Examples 22 to 26 and Comparative Examples 15 and 16, to obtain honeycomb structures of Examples 41 to 43 and Comparative Examples 25 and 26. As to each of thus obtained honeycomb structures of Examples 41 to 43 and Comparative Examples 25 and 26, yield rate was determined by the following method, and the results are shown in Table 5.

[Yield Rate]

In each of the examples and comparative examples, 100 honeycomb structures (obtained by forming the plugged portions in the finished honeycomb dried bodies, firing the bodies and then subjecting the bodies to the outer periphery processing) were prepared, and a plugged portion forming state was checked by visual observation. As a result of this check, a structure in which the plugged portions were normally formed at the open ends of all the cells was regarded as a passed structure. On the other hand, a structure in which the cells collapsed by the buckling were present and the plugged portions were not normally formed in the open frontal areas of the cells was regarded as a failed structure. Then, a rate of the passed structures with respect to all the checked honeycomb structures (100 structures) was defined as the yield rate. Here, "the passed structures" includes structures where the cells which were not normally provided with the plugged portions were present prior to the outer periphery processing, but it was possible to remove the cells which were not normally provided with the plugged portions by the outer periphery processing.

in excess of 15 mm. In particular, in Example 42 in which the drop value was 10 mm, the occurrence of the buckling was not recognized at all. Moreover, the yield rate of Comparative Example 25 in which the drop value was smaller than 5 mm and Comparative Example 26 in which the drop value was in excess of 15 mm were 25% or less, whereas the yield rate of each of Examples 41 to 43 in which the drop value was from 5 to 15 mm was 100%.

The present invention can suitably be utilized as a method for supporting a honeycomb formed body formed by extrusion, in a manufacturing process of a honeycomb structure for use in manufacture of a carrier of an exhaust gas purifying catalyst, a filter such as DPF, or the like.

DESCRIPTION OF REFERENCE NUMERALS

1: honeycomb formed body, 2: cell, 3: partition wall, 4: peripheral wall, 5: one end face, 6: another end face, 7: cradle, 8: supporting surface, 10: kneaded material, 11: cylinder of an extrusion machine, 12: die holder, 13: die, 14: die main body, 15: retainer plate, 16: slit, 17: conveyor, 18: back hole, 20: measurement stand, 21: laser displacement meter, A: distance (drop) in a vertical direction between the lowermost end of the honeycomb formed body immediately after extruded through the die and the lowermost end of the supporting surface of the cradle during horizontal movement, B: length of the cradle, C: distance in a horizontal direction between the die and the cradle, D: thickness of the die holder, E: extruding direction, L: direction (axial direction) from the one end face towards another end face, P1, P2 and P3: measurement start position, Q1, Q2 and Q3: contour measuring portion, R: peripheral direction, and T: rotating direction.

What is claimed is:

1. A method of making a honeycomb formed body comprising: extruding a kneaded material obtained by kneading a forming raw material through a die to form a honeycomb formed body having partition walls defining a plurality of cells extending in an extruding direction, and supporting the honeycomb formed body extruded through the die by a cradle having a supporting surface at a downstream portion of the die in the extruding direction, wherein a horizontal continuous forming machine is used in the extrusion of the honeycomb formed body such that the extruding direction is horizontal,

TABLE 5

| | Outer diameter of formed body (mm) | Length of formed body (mm) | Partition wall thickness (μm) | Cell density (cells/cm$^2$) | Open frontal area (%) | Die slit *1 | Hardness of kneaded material (kgf) | Forming method *2 | Extrusion speed (mm/s) | Drop measurement position *3 (mm) | Drop value (mm) | Incidence of Buckling (%) | Yield Rate (%) |
|---|---|---|---|---|---|---|---|---|---|---|---|---|---|
| Comparative Example 25 | 450 | 480 | 300 | 46.5 | 68.5 | S | 1.23 | Horizontal continuous | 7 | 580 | 2 | 100 | 20 |
| Example 41 | 450 | 480 | 300 | 46.5 | 68.5 | S | 1.23 | Horizontal continuous | 7 | 580 | 5 | 5 | 100 |
| Example 42 | 450 | 480 | 300 | 46.5 | 68.5 | S | 1.23 | Horizontal continuous | 7 | 580 | 10 | 0 | 100 |
| Example 43 | 450 | 480 | 300 | 46.5 | 68.5 | S | 1.23 | Horizontal continuous | 7 | 580 | 15 | 6 | 100 |
| Comparative Example 26 | 450 | 480 | 300 | 46.5 | 68.5 | S | 1.23 | Horizontal continuous | 7 | 580 | 20 | 100 | 25 |

*1: "S" means that the widths of all the slits are uniform.
*2: "Horizontal continuous" means a horizontal continuous extrusion method.
*3: "Drop measurement position" means a distance in a horizontal direction between a die and a cradle when a drop value is measured.

(Consideration 3)

As shown in Table 5, it has been seen that Examples 41 to 43 in which a drop value was from 5 to 15 mm had a remarkably lower incidence of buckling than Comparative Example 25 in which the drop value was smaller than 5 mm and Comparative Example 26 in which the drop value was the cradle moves horizontally in the extruding direction after lifting from a position below the die at a position downstream of the die, a lowermost end of the supporting surface of the cradle is located below the lowermost end of the honeycomb formed body immediately after extruded through the die during a horizontal movement, and a distance in a vertical direction between the lowermost end of the honeycomb formed body immediately after extruded through the die and the lowermost end of the supporting surface of the cradle is from 5 to 15 mm during the horizontal movement, wherein a support for the honeycomb formed body is not interposed between the die and the cradle, wherein the honeycomb formed body has a columnar shape and an outer diameter of from 150 to 450 mm, and wherein a ratio of the outer diameter of the honeycomb formed body to a length of the honeycomb formed body is 0.86 or more and 3.75 or less.

2. The method of making the honeycomb formed body according to claim 1, wherein the cradle is disposed so that a longitudinal direction of the cradle is the same as the extruding direction, and moves horizontally in the extruding direction at the same speed as an extrusion speed.

3. The method of making the honeycomb formed body according to claim 1, wherein the distance in the vertical direction between the lowermost end of the honeycomb formed body immediately after extruded through the die and the lowermost end of the supporting surface of the cradle is from 8 to 12 mm during horizontal movement.

4. The method of making the honeycomb formed body according to claim 1, wherein the honeycomb formed body has a columnar shape, and an open frontal area of the honeycomb formed body in a cross section perpendicular to an axial direction is from 69 to 91%.

5. The method of making the honeycomb formed body according to claim 1, wherein a hardness of the kneaded material is from 0.8 to 2.8 kgf, and wherein the hardness of the kneaded material is measured with an RT-2005 DD on conditions: a penetrating jig of ϕ5 mm spherical shape, a penetrating speed of 2 cm/min and a penetrating depth of 10 mm.

6. The method of making the honeycomb formed body according to claim 1, wherein a length of the cradle is from 100 to 500 mm.

7. The method of making the honeycomb formed body according to claim 1, wherein the distance in the vertical direction between the lowermost end of the honeycomb formed body immediately after extruded through the die and the lowermost end of the supporting surface of the cradle during the horizontal movement is measured when a distance in the horizontal direction between the die and the cradle is determined by adding 100 to 200 mm to the length of the cradle.

8. The method of making the honeycomb formed body according to claim 2, wherein the distance in the vertical direction between the lowermost end of the honeycomb formed body immediately after extruded through the die and the lowermost end of the supporting surface of the cradle is from 8 to 12 mm during horizontal movement.

9. The method of making the honeycomb formed body according to claim 2, wherein the honeycomb formed body has a columnar shape, and an open frontal area of the honeycomb formed body in a cross section perpendicular to an axial direction is from 69 to 91%.

10. The method of making the honeycomb formed body according to claim 3, wherein the honeycomb formed body has a columnar shape, and an open frontal area of the honeycomb formed body in a cross section perpendicular to an axial direction is from 69 to 91%.

11. The method of making the honeycomb formed body according to claim 8, wherein the honeycomb formed body has a columnar shape, and an open frontal area of the honeycomb formed body in a cross section perpendicular to an axial direction is from 69 to 91%.

12. The method of making the honeycomb formed body according to claim 2, wherein a hardness of the kneaded material is from 0.8 to 2.8 kgf, and wherein the hardness of the kneaded material is measured with an RT-2005 DD on conditions: a penetrating jig of ϕ5 mm spherical shape, a penetrating speed of 2 cm/min and a penetrating depth of 10 mm.

13. The method of making the honeycomb formed body according to claim 3, wherein a hardness of the kneaded material is from 0.8 to 2.8 kgf, and wherein the hardness of the kneaded material is measured with an RT-2005 DD on conditions: a penetrating jig of ϕ5 mm spherical shape, a penetrating speed of 2 cm/min and a penetrating depth of 10 mm.

14. The method of making the honeycomb formed body according to claim 8, wherein a hardness of the kneaded material is from 0.8 to 2.8 kgf, and wherein the hardness of the kneaded material is measured with an RT-2005 DD on conditions: a penetrating jig of ϕ5 mm spherical shape, a penetrating speed of 2 cm/min and a penetrating depth of 10 mm.

* * * * *